(12) United States Patent
Casini (10) Patent No.: US 8,100,378 B1
(45) Date of Patent: Jan. 24, 2012

(54) COUPLING SYSTEM FOR VERTICALLY ENGAGING SUPPORT COLUMNS FOR CONCRETE MULTI FLOOR CONSTRUCTION

(76) Inventor: Peter Casini, Forest Hills, NY (US)

( * ) Notice: Subject to any disclaimer, the term of this patent is extended or adjusted under 35 U.S.C. 154(b) by 975 days.

(21) Appl. No.: 12/052,638

(22) Filed: Mar. 20, 2008

(51) Int. Cl.
*E04G 11/48* (2006.01)
*F16B 7/18* (2006.01)
*A47B 7/02* (2006.01)

(52) U.S. Cl. ....... 249/18; 108/91; 108/158.11; 108/186; 403/296

(58) Field of Classification Search ............... 249/18, 249/28; 108/91, 158.11, 186, 190; 403/292, 403/296
See application file for complete search history.

(56) References Cited

U.S. PATENT DOCUMENTS

| | | | |
|---|---|---|---|
| 1,131,479 A | 3/1915 | Dale | |
| 1,330,290 A | 2/1920 | Westman | |
| 1,490,461 A | 4/1924 | Garlinghouse | |
| 2,868,602 A * | 1/1959 | Drezner | 403/292 |
| 3,162,418 A | 12/1964 | Dudley | |
| 3,239,188 A | 3/1966 | Gostling | |
| 3,533,592 A | 10/1970 | Jennings | |
| 3,614,048 A | 10/1971 | Young | |
| 3,630,479 A | 12/1971 | Sullivan | |
| 3,647,173 A * | 3/1972 | Pipala | 249/18 |
| 3,827,665 A * | 8/1974 | Kistler | 249/18 |
| 3,847,340 A * | 11/1974 | Ficken et al. | 249/18 |
| 4,122,645 A * | 10/1978 | Tooley | 249/18 |
| 4,325,532 A | 4/1982 | Blank | |
| 4,717,517 A | 1/1988 | Halberstadt | |
| 5,149,149 A * | 9/1992 | Wu | 403/292 |
| 6,176,463 B1 * | 1/2001 | Rock | 249/18 |
| 6,189,854 B1 | 2/2001 | de Maturana | |
| 6,840,702 B2 * | 1/2005 | Ko | 403/292 |

FOREIGN PATENT DOCUMENTS

| | | |
|---|---|---|
| GB | 19575 | 0/1913 |
| GB | 128832 | 7/1919 |
| RU | 2040657 | 7/1995 |
| WO | WO01/69001 | 11/2000 |

* cited by examiner

*Primary Examiner* — Michael Safavi
(74) *Attorney, Agent, or Firm* — Michael I. Kroll (57) ABSTRACT

A vertical column coupling providing a means for creating entire concrete forms for constructing the ceiling and floors of multistory buildings utilizing a plurality of pipe columns and supported form slabs that are erected to a desired height and in horizontal alignment. Additionally the present invention provides for the ability to pour concrete in one continuous pour from the top and easy disassembly and removal of the device after said poured concrete has dried.

16 Claims, 11 Drawing Sheets

COUPLING SYSTEM FOR VERTICALLY ENGAGING SUPPORT COLUMNS FOR CONCRETE MULTI FLOOR CONSTRUCTION

BACKGROUND OF THE INVENTION

1. Field of the Invention

The present invention relates generally to concrete forms and their construction and, more specifically, to an easily erected then removable plurality of pipe columns that interconnect vertically with coupling system to present a continuous upheld planar surfaces via horizontally extending form slabs utilized in forming concrete floors or ceilings while building a multistory building.

2. Description of the Prior Art

There are other concrete forming devices designed for constructing multi stor. Typical of these is U.S. Pat. No. 1,131,479 issued to Dale on Mar. 9, 1915.

Another patent was issued to Westman on Feb. 10, 1920 as U.S. Pat. No. 1,330,290. Yet another U.S. Pat. No. 1,490,461 was issued to Garlinghouse on Apr. 15, 1924 and still yet another was issued on Dec. 22, 1964 to Dudley as U.S. Pat. No. 3,162,418.

Another patent was issued to Gostling on Mar. 8, 1966 as U.S. Pat. No. 3,239,188. Yet another U.S. Pat. No. 3,533,592 was issued to Jennings on Oct. 13, 1970. Another was issued to Young on Oct. 19, 1971 as U.S. Pat. No. 3,614,048 and still yet another was issued on Dec. 28, 1971 to Sullivan as U.S. Pat. No. 3,630,479.

Another patent was issued to Pipala on Mar. 7, 1972 as U.S. Pat. No. 3,647,173. Yet another U.S. Pat. No. 3,847,340 was issued to Ficken et al. on Nov. 12, 1974. Another was issued to Blank on Apr. 20, 1982 as U.S. Pat. No. 4,325,532 and still yet another was issued on Jan. 5, 1988 to Halberstadt as U.S. Pat. No. 4,717,517.

Another patent was issued to Irurzun Saez De Maturana on Feb. 20, 2001 as U.S. Pat. No. 6,189,854. Yet another U.K. Patent No. GB19575 was issued to Wunder on May 1, 1913. Another was issued to Aleksandrovic on Jul. 25, 1995 as Russian Patent No. RU2040657 and still yet another was issued on Jul. 9, 1919 to The Uni-Form Company as U.K. Patent No. GB128832. Another was issued to Thompson on Sep. 20, 2001 as International Patent Application No. WO01/69001.

U.S. Pat. No. 1,131,479

Inventor: George E. Dale

Issued: Mar. 9, 1915

Centering for concrete floor a ceiling construction, comprising metal channel members having side flanges, supports for said members, spacing means disposed between said channel members and carried by flanges, and independent supports for said spacing means.

U.S. Pat. No. 1,330,290

Inventor: Olaf J. Westman

Issued: Feb. 10, 1920

A trestle of the type described, comprising a frame, upright members slidably mounted thereon and a plurality of supporting uprights mounted on the top edge of said frame and temporarily secured to said slidable uprights and adapted to support the weight of a floor during construction.

U.S. Pat. No. 1,490,461

Inventor: Leslie H. Garlinghouse

Issued: Apr. 15, 1924

A mold form apparatus for concrete floors and the like comprising in combination a mold section, false work, ledger members removably carried on the false work and adapted to support the mold section, and a take down mechanism for taking down the mold section together with temporary ledger members to support the mold section to permit the removal of the first mentioned ledgers.

U.S. Pat. No. 3,162,418

Inventor: Homer T. Dudley

Issued: Dec. 22, 1964

A form support comprising, in combination, a base flange and a lower tubular support column vertically supported thereon, an upper tubular support column telescopically adjustable outside of said lower column, a horizontal member attached to said upper column at its upper end, a jack lift terminating at its upper end with a platform member, said member having a partial circumference recess in dimension of substantially fit one half of the periphery of said lower end of said upper column, a jack lift handle pivotal about said housing and engageable with said jack lift for vertical movement to a desired position, and vertically alignable grooves in said upper and lower columns to receive opposing wedge locking means for interlocking said upper and lower columns at the said desired position.

U.S. Pat. No. 3,239,188

Inventor: Peter E. Gostling

Issued: Mar. 8, 1966

A means for supporting shuttering elements in the construction of roofs, floors and ceilings formed from concrete and other settable material, said means comprising an extensible prop embodying relatively upper and lower prop members, a shuttering member supported on the upper prop member and having an upwardly directed concrete engaging, a shuttering element support mounted on the upper prop member and slidably axially thereof between a lower inoperative position and an upper operative position for supporting a plurality of shuttering elements in flush with the corresponding face of the shuttering member support, interengageable abutment portions on the upper prop member and shuttering element support retaining the latter in its operative position, one of said abutment portions comprising an abutment face inclined to horizontal, means mounting said abutment portions for relative turning movement about the longitudinal axis of the prop between an operative position in which said abutment portions interengage and a free portion in which said abutment portions are disengaged from one another to permit of the shuttering element support being slidden downwardly relative to the prop and shuttering member supported thereon to effect lowering and removal of the shuttering elements.

U.S. Pat. No. 3,533,592

Inventor: William A. Jennings

Issued: Oct. 13, 1970

A shoring structure includes four upright corner posts capable in being provided with attachable shore brackets that are connectable to the posts for extension laterally outward therefrom. Metal concrete forms are extended between and releasably connected to the posts and to the brackets to form a continuous horizontal supporting area, with the area portion overlaying the brackets being in a overhanging relation relative to the normal area portion defined by the four corner posts. The normal area portion of the shore structure may thus be readily increased to provide a supporting area for cantilever floor structures such as outside balcony areas, or extended ledge work and the like where vertical support for the overhanging concrete.

U.S. Pat. No. 3,614,048

Inventor: George B. A. Young

Issued: Oct. 19, 1971

A concrete slab casting system includes props with heads beams extending between the heads and panels resting on elements slidable vertically on the beams. The elements can be locked in raised positions for casting operation and lowered for removal of the panels one at a time. The joints between the beams and the heads permits removal of the beams without lowering the heads.

U.S. Pat. No. 3,630,479

Inventor: Jack E. Sullivan

Issued: Dec. 28, 1971

The means and method herein described may be used to produce upon supporting walls, an elevated monolithic slab of concrete or the like, to serve roofs, gabled or flat for building structures generally, for floors of a building, for platforms, etc. Use is made of a simplified form structure comprising a plurality of reusable form units, all alike, assembled side by side and end to end, to be erected upon supporting walls therefor and upon a temporary intermediate supporting means, in such a way as to permit pouring of a fluid concrete thereover and into to produce, when set, a slab which rests directly upon the tops of such walls. As part of the monolithic slab produced, built in joists or trusses may be formed upon its underside concurrently in the single concrete pouring operation involved. All form units are so interfitted as to remain fixedly in operative positions, minus any fastening means therefor, thereby facilitating a subsequent dismantling of the form structure, unit by unit, for removal and repeated use elsewhere.

U.S. Pat. No. 3,647,173

Inventor: Dennis R. Pipala

Issued: Mar. 7, 1972

A supporting shore for a concrete ceiling slab, having a vertically and downwardly shiftable rotatable member which normally supports the adjacent truncated four corners of a quadrilaterally arranged group of four inverted generally rectangular pan-shaped slab-supporting domes and which, in the lowered and rotated position of the member, moves out of operative register with two of the four corners so as to release the other two corners for dome-removal purposes, while at the same time the shore continues to support the concrete ceiling slab until the latter has become fully hardened.

U.S. Pat. No. 3,847,340

Inventor: Charles L. Ficken et al.

Issued: Nov. 12, 1974

A shoring fixture for pouring an overhead concrete structure having a vertically adjustable post, a crosshead affixed to the upper end of the post, a pair of deck sections which have their inner ends supported on the crosshead in end-to-end abutting relation, and a brace assembly extending between the post and the outer end of each deck section for supporting the deck sections in a pouring position. Each deck section is pivotally connected to the shoring post by its respective brace assembly in a manner which permits the deck section to be folded to a collapsed position so that the deck sections lie along the shoring post to facilitate storing and transporting of the shoring fixture. Shoring fixtures of this invention may be arranged in parallel rows with the outer ends of the deck sections of the shoring fixtures in each row being joined together by extensible members carried by the deck sections to constitute a shoring system.

U.S. Pat. No. 4,325,532

Inventor: Wilhelm W. A. O. Blank

Issued: Apr. 20, 1982

In a formwork system frames are mounted between horizontal supports. The support means on the frames are offset relative to the horizontal axis so that the inversion of the frames enables the level of the upper surface thereof to be adjusted. Thus the same components can be used to make a formwork for fine finish concrete or standard finish. In an alternative embodiment the support means on the horizontal support is offset so that the adjustment can be effected by reversing the support.

U.S. Pat. No. 4,717,517

Inventor: Alex E. Halberstadt

Issued: Jan. 5, 1988

A multi-story concrete building is constructed concurrently, that is, the steps for constructing the same are carried out simultaneously on different respective stories. To achieve this end, vertical formwork members for forming the columns and bearing walls for one story are erected. Then decking formwork is erected for forming a concrete slab to serve as the floor for the next story thereabove. Formwork spacers are affixed to the tops of the vertical formwork members and these spacers provide mounts, extending through the thickness of the slab to be formed, for mounting the vertical formwork members for the next story. The vertical formwork members for the next story are then erected. Fresh concrete is poured into at least the vertical fromwork members and is permitted to cure and solidify into the vertical support members for that story. Other formwork members are erected above the next story while concrete is concurrently poured and formwork is stripped on different respective stories. The form spacers can, e.g., be channel members or, alternatively, closed-end angle members.

U.S. Pat. No. 6,189,854

Inventor: Miguel Angel Irurzun Saez De Maturana

Issued: Feb. 20, 2001

A formwork is structured of a lower substrate of beams that are supported on struts, and a substrate with identical beams supported on and perpendicular to the lower beams. Resting upon the upper beams, there are panels of wood that make up the surface of the formwork; the beams are formed from steel plate of great strength and small wall thickness. The beams have a trapezoidal configuration with an upper projection forming a channel that holds wooden strips. The beams have lateral folds or lateral ridges for rigidity. The beams of the lower substrate rest upon bidirectional heads having wings and a lower cylindrical portion that connects onto the upper end of a corresponding strut.

U.K. Patent Number GB19575

Inventor: John Wunder

Issued: May 1, 1913

This invention relates to reinforced concrete floors and columns of the kind in which a reinforced slab floor is formed integrally with a number of reinforced columns having vertical rods embedded therein and provided with metal plates embedded in the top of each column and in the said slab floor.

Russian Patent Number RU2040657

Inventor: Belimov Vladamir Aleksandrovic

Issued: Jul. 25, 1995

Concrete Form for erecting walls and floors.

U.K. Patent Number GB128,832

Inventor: The Uni-Form Company

Issued: Jul. 9, 1919

Casting and moulding in situ. In casting concrete floors and walls, the supporting-members for the flanged mould plates are made of channel section so that they may be reversed to form mould spaces for floor beams and wall pilasters, and the flanges of the mould plates are clamped between the channels and cross-bars by bolts. The inner face or edges of the channel are flush with the inner surface of the mould plates. An arched plate clamped inside the channels in combination with flanged mould plates. Both sides of the mould may consist of the arched plates and channels. Mould plates with channel-irons riveted or welded to the edges and provided with swivelling or sliding catches to engage behind or below the channels. The edge channels are supported by the cross-bars. The flanges may be integral with the mould plates and be secured to the wall channels by clips or rest directly on the cross-bars for floors. The temporary floor supports consist of stringers, planks, and wedges; thin channels and cover-plates span the gaps between adjacent channels and mould plates respectively. The floor rib reinforcing-bars are supported in the manner described in Specification 118,826. To ensure tight joints between the mould plates, a thin sheet of metal, paper, etc., doubled and with turned-out edges is inserted between the plates; or a single sheet provided with two curved flanges may be similarly used.

International Patent Application Number
WO01/69001

Inventor: William J. Thompson

Published: Nov. 21, 2000

An internally threaded insert anchor for use in poured concrete floors having metal decking or wood form is described which provides setal deck or wood form, prior to the concrete being poured. Once locked into the concrete floor, the threaded insert anchor provides easy attachment for the support rods that carry the racks of utility, piping and ceiling grid systems for the building. Each threaded insert anchor is capable of accepting two different size rods or bolts with different thread cuts. The internal threaded apertures are protected from concrete intrusion during the pour by the plastic or metal sleeve. Moreover, the anchors are designed so that subsequent spraying of the ceiling with fire retardant or insulation foam will not penetrate into the threaded apertures, so as to prevent subsequent entry of the support rods.

While these concrete forms may be suitable for the purposes for which they were designed, they would not be as suitable for the purposes of the present invention, as hereinafter described.

SUMMARY OF THE PRESENT INVENTION

A primary object of the present invention is to provide a concrete forming device that can be easily assembled and disassembled utilizing interconnected pipe columns and that are vertically connected end-to-end via specially customized couplings in conjunction with shims or collars.

Another object of the present invention is to provide a concrete forming device that allows for the entire layout of a multi-story buildings ceiling and floor forms to be constructed at once and allowing concrete to be poured from the ceiling down in one continuous pour if desired.

Yet another object of the present invention is to provide concrete forming device having pipe columns that are interconnected by utilizing an intermediate base coupling with mating threaded members.

Still yet another object of the present invention is to provide a concrete forming device that utilizes collars or shims with and associated base coupling to aid in removing base couplings during disassembly of the device after poured concrete has dried.

Another object of the present invention is to provide a concrete forming device having form slabs with supporting brackets for producing a continuous planer surface for forming ceilings and floors out of concrete in a single pour from the top.

Additional objects of the present invention will appear as the description proceeds.

The present invention comprises a pipe column having a threaded cavity on one end and a smooth bore cavity on the other with brackets positioned approximate its top portion for supporting form slabs horizontally. Also provided is a coupling for mating one pipe column to another with the coupling comprising a short length of pipe column having male portions on opposing ends with one having threads while the other is smooth and pin-like with each mateable to a respective pipe column cavity.

Also provided are spacers comprising a multi-part collar or shims positionable between the coupling threaded end and pipe column threaded end providing means for easily disassembling the formwork after use by removing the collar or shims enabling the coupling to be threaded further into the pipe column until the coupling pin end is free of its seated positioned within the pipe column.

To expand floors desired to an "x" and "z" surface area, columns are raised in a side by side manner so that they align adjacent to the sides of the upheld form slabs.

Additionally the present invention provides a builder the ability to erect a buildings floor and ceiling forms quickly and all at once so that pouring of concrete can start from the top if desired as a single continuous pour.

The present invention overcomes the shortcomings of the prior art by providing a means for creating entire concrete forms for constructing the ceiling and floors of multistory buildings utilizing a plurality of pipe columns and supported form slabs that are erected to a desired height and in horizontal alignment. Additionally the present invention provides for the ability to pour concrete in one continuous pour from the top and easy disassembly and removal of the device after said poured concrete has dried.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

LIST OF THE REFERENCED NUMERALS

12 slab support column assembly
14 main support column
16 diagonal brace
18 main support bracket
20 cross member
22 top end of 14
24 threaded cavity of 22
26 form slab
30 bottom portion of 14
32 smooth recess of 30
34 support pipe cut-out
36 fastener recess of 26
38 fastener receiving recess of 18
40 coupling
42 threaded male projection of 40
44 smooth finish steel pin
46 shim
47 semi-circular cut-out of 46
48 collar
49 semi-cylindrical mating half of 48
50 L-shaped flange of 48
52 locking pin of 48
54 concrete

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
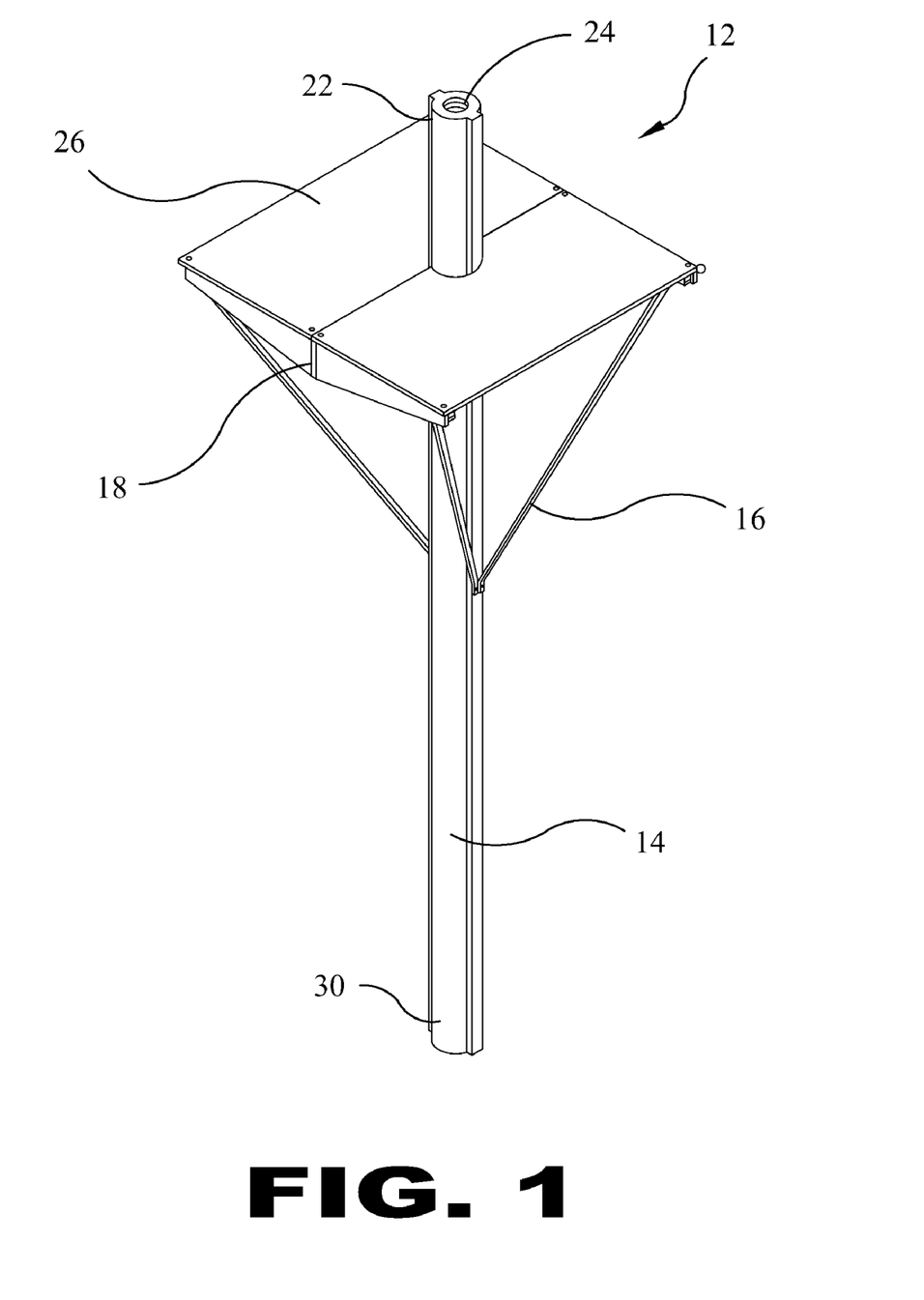
FIG. 1 is an illustrative view of the slab support column assembly.

FIG. 1 is an illustrative view of the present invention. Shown is an illustrative view of the present invention being a slab support column assembly 12 comprising a main support pipe 14 with a plurality of diagonal braces 16 divergently extending therefrom and terminating at the ends a pair of spaced apart horizontal main support bracket 18. The top end 22 of the support pipe 14 has a threaded cavity 24 for engagement the bottom end 30 of the subjacent support pipe 14.

Figure 2:
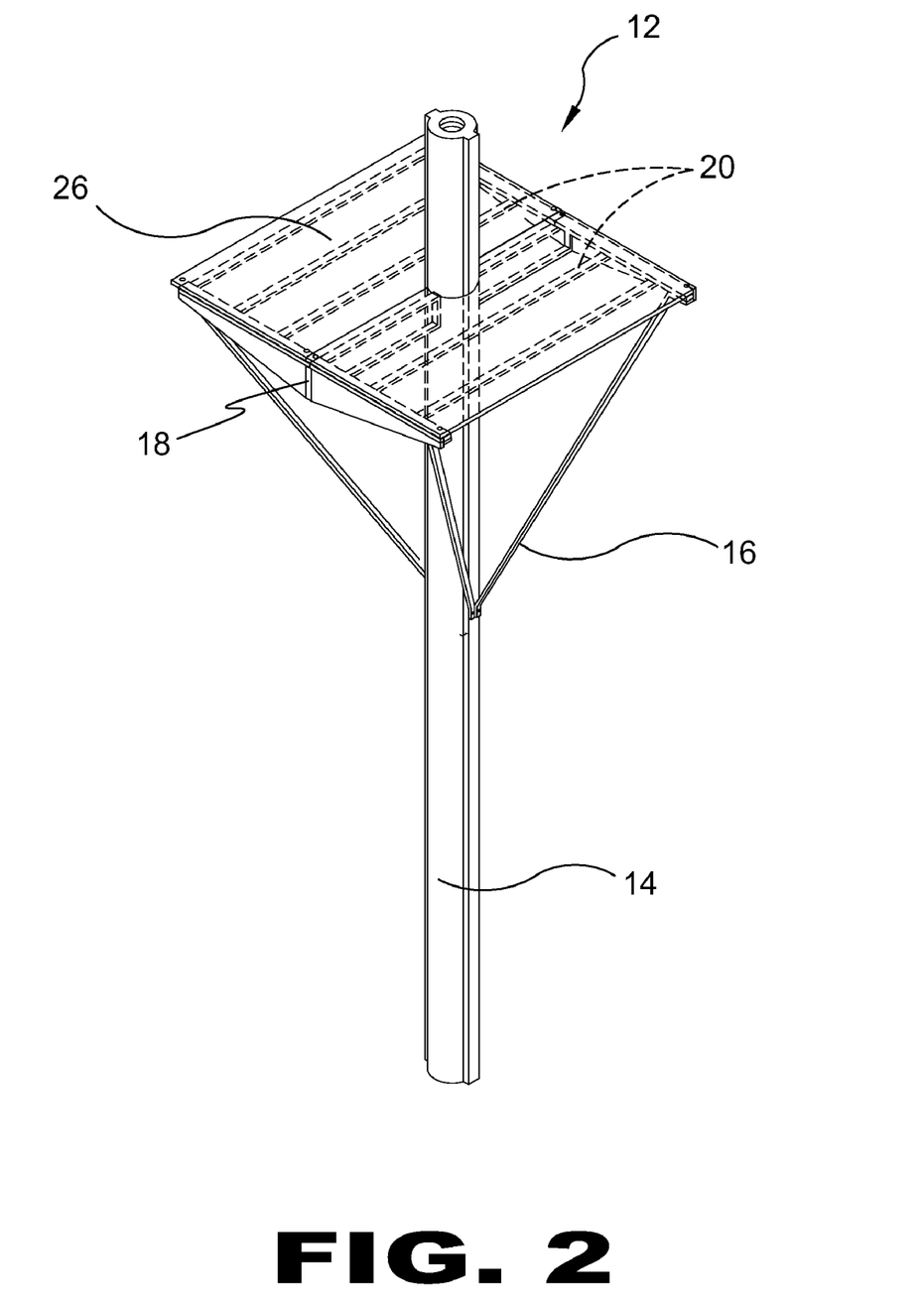
FIG. 2 is a sectional illustrative view of the slab support column assembly.

FIG. 2 is a sectional illustrative view of the present invention. Shown is an illustrative view of a support column assembly 12 showing a plurality of cross members 20 communicating perpendicularly with the support brackets 18 and supported by the diagonal braces 16 affiliated with the support pipe 14. The position of the form slab 26 seated on the cross members 20 is shown in hidden line.

Figure 3:
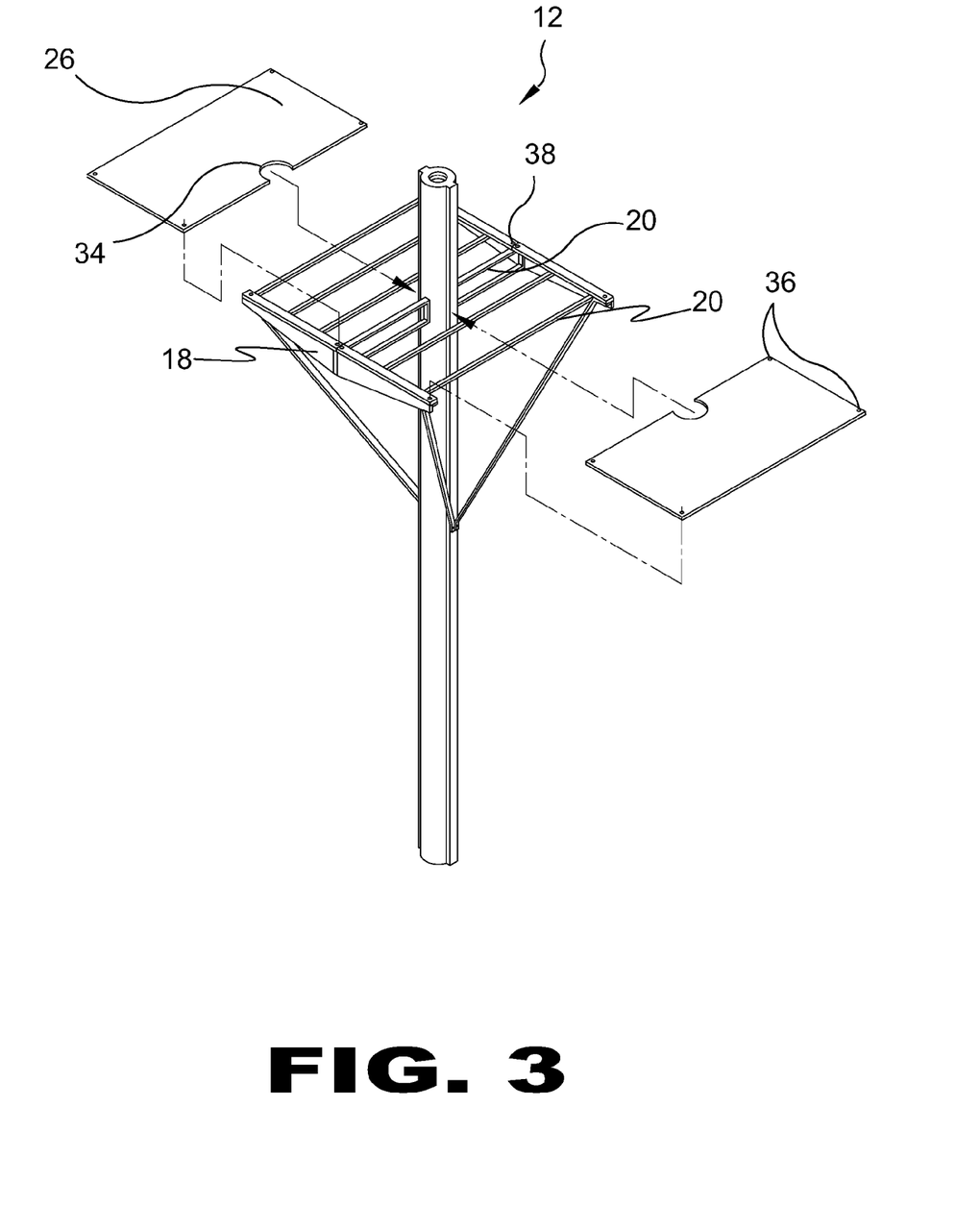
FIG. 3 is an exploded perspective view of the slab support column assembly.

FIG. 3 is an exploded perspective view of the present invention. Shown is an exploded view of the present invention depicting the form slabs 26 having a support pipe cut-out 34 and recesses 36 for using fastener elements to secure it to the main support bracket 18 which has mating fastener receiving recesses 38 and rest on the cross members 20.

Figure 4:
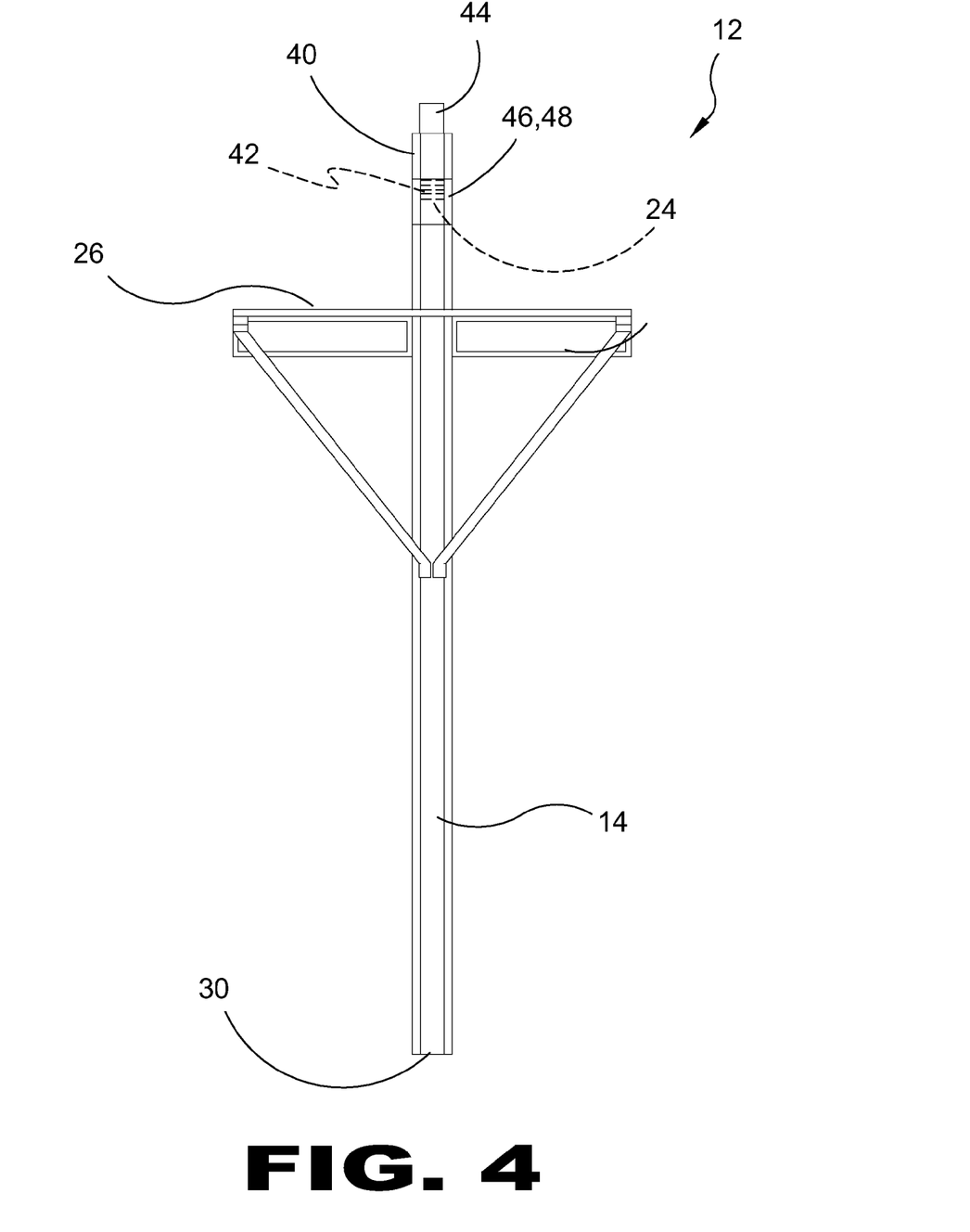
FIG. 4 is a side view of the slab support column assembly.

FIG. 4 is a side view of the present invention. Shown is a side view of the slab support column assembly 12 depicting how the form slab 26 when mounted to the pipe column 14 presents a flat horizontal surface whereby concrete can be poured to form the floor of a multistory building. Introduced are the critical elements of the present invention which are a coupling 40 that has a threaded male projection 42 on the bottom portion and smooth finish steel pin 44 extending from the top. The coupling 40 works in conjunction with shims 46 or a collar 48 to allow for incremental adjustment to facilitate a secure connection between the two support pipes 14 during installation and then to selectively provide play therebetween when breaking down the structure.

Figure 5:
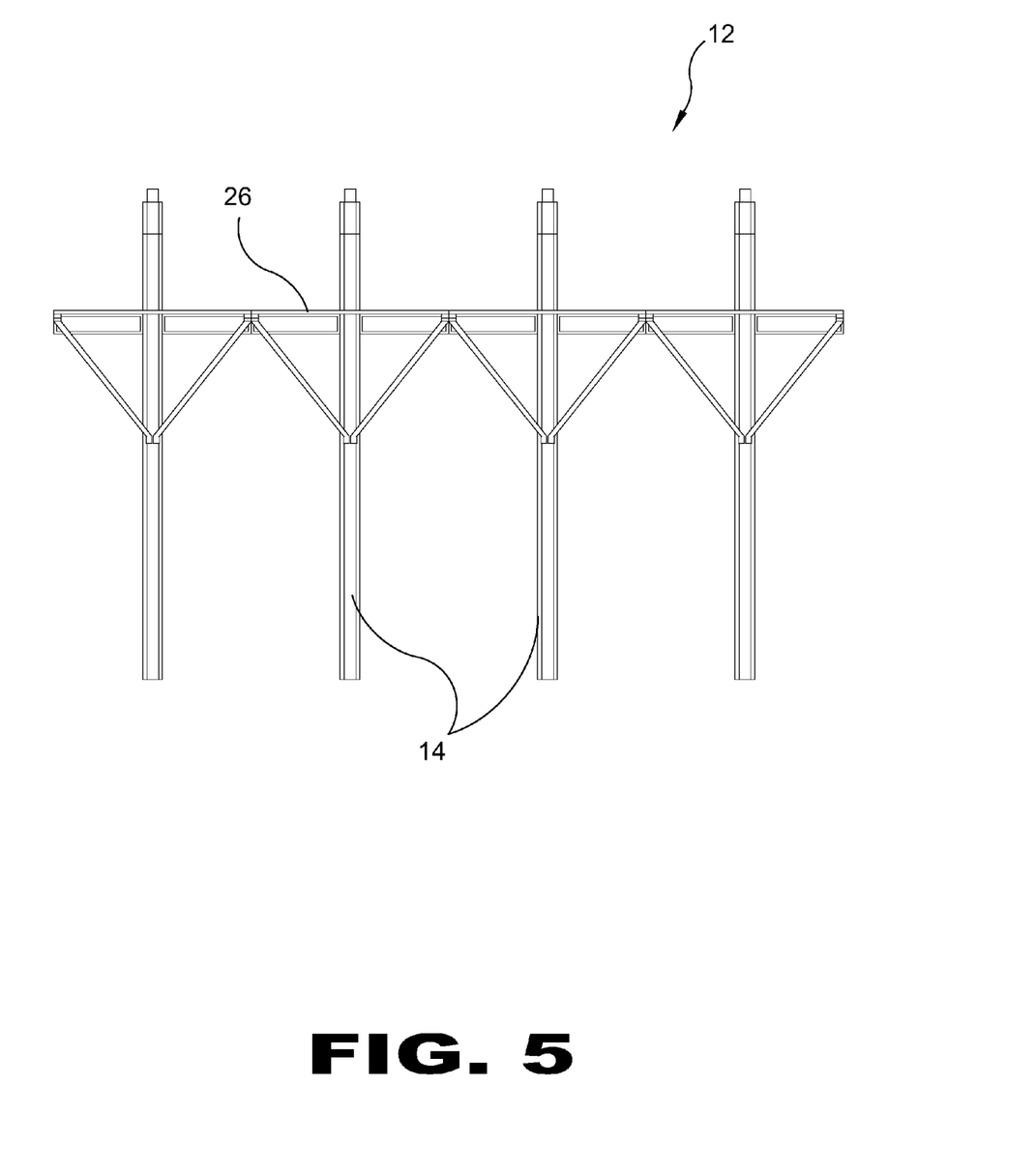
FIG. 5 is a side view of a plurality of slab support column assemblies.

FIG. 5 is a side view of the present invention. Shown is a side view of a plurality of the column support assemblies 12 ganged together side by side present a supported flat horizontal surface that may be utilized in the pouring of concrete into a form 26 to create a floor for a multistory story building.

Figure 6:
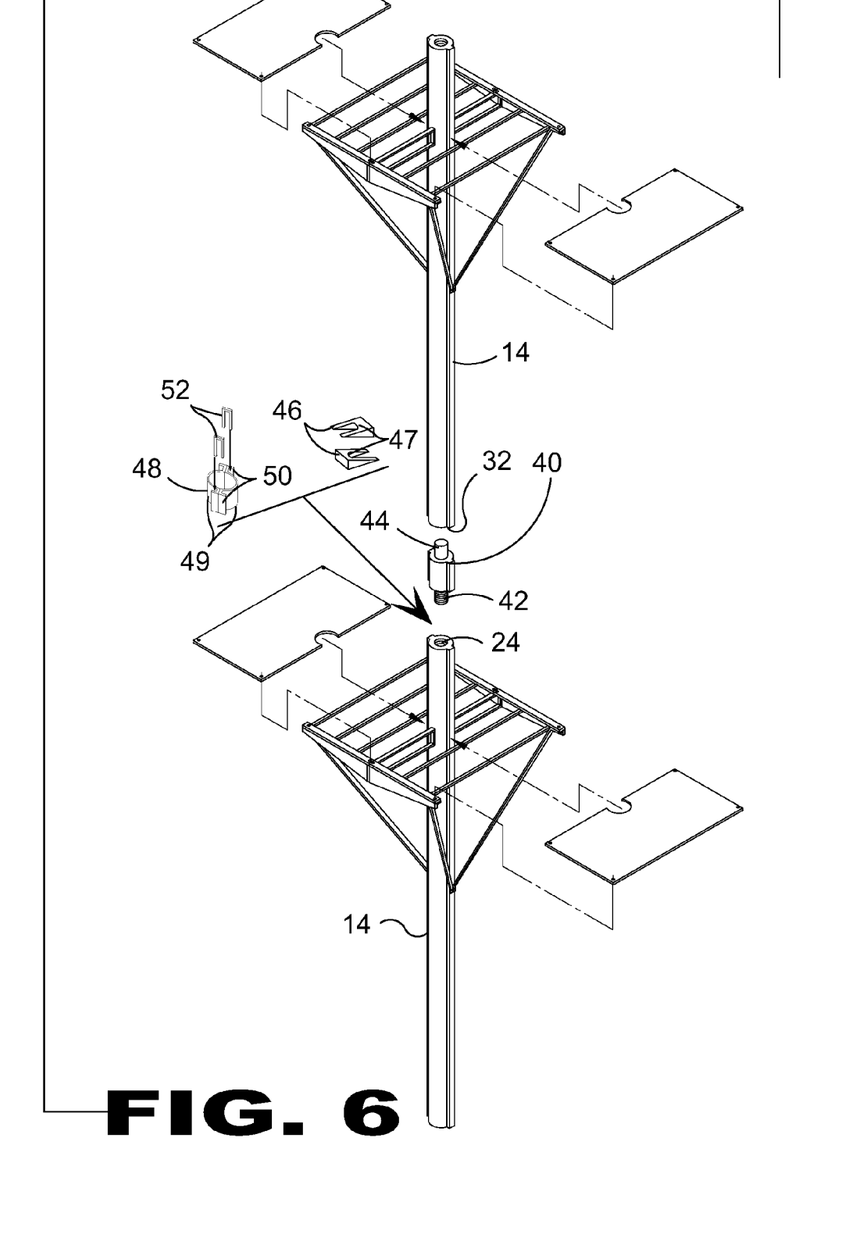
FIG. 6 is a perspective view showing the vertical connection between slab support column assemblies.

FIG. 6 is a perspective view of a the coupling means of the present invention. The threaded male projection 42 of the coupling 40 is partially screwed into the threaded cavity 24 of the lower support pole 14 leaving room for the placement of the collar 48 or shims 46 therebetween prior to tightening. The shims 46 are significantly wedge-shaped with semi-circular cut-outs 47 and the collar 48 has two half cylinder mating halves 49 that L-shaped flanges 50 that are held together with a pair of U-shaped pins 52 once in place. The smooth finish steel pin 44 is inserted into the smooth recess 32 of the upper support pipe 14 and allow for the rotation of said pipe 14 for alignment with adjacent columns during installation.

Figure 7:
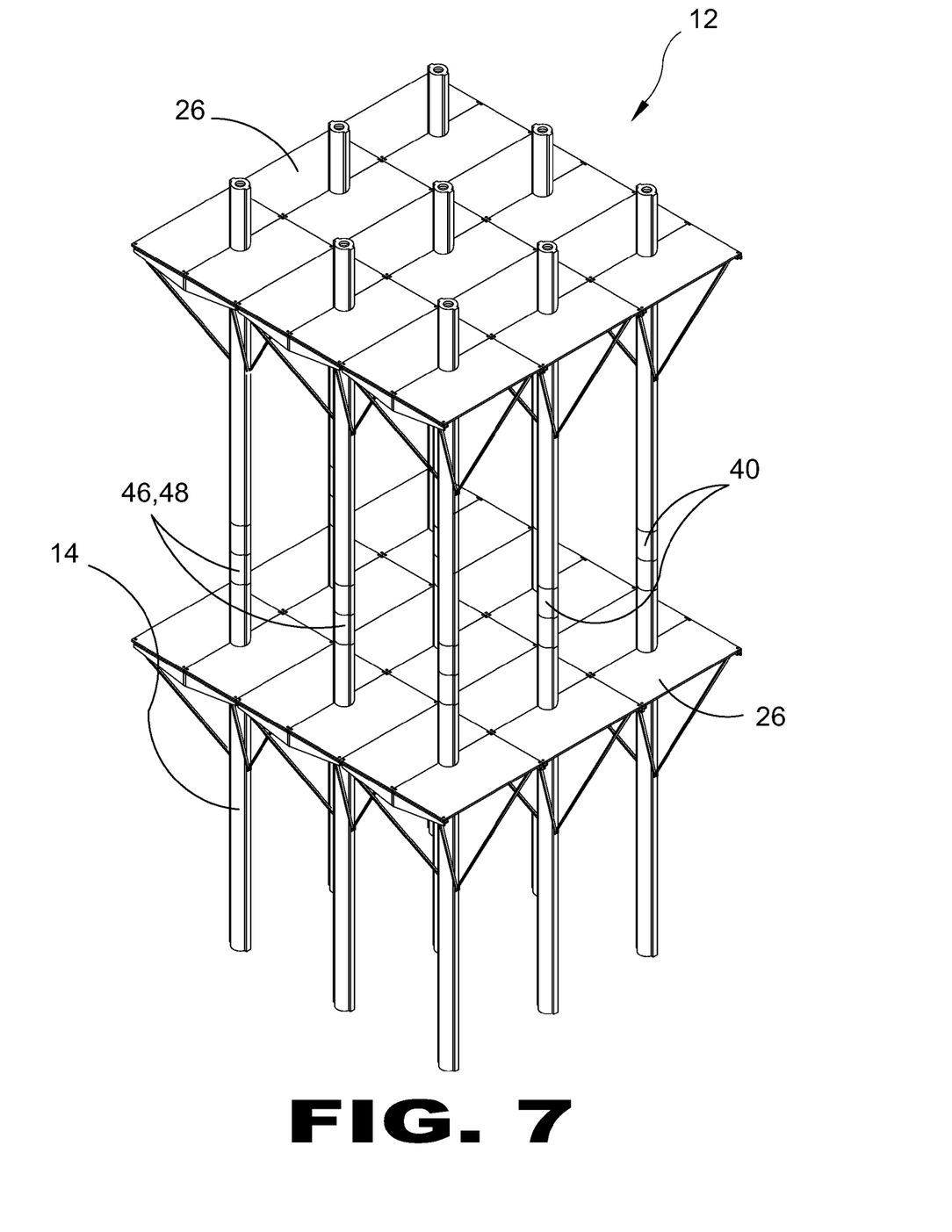
FIG. 7 is a perspective view of a two-tier arrangement of slab support column assemblies.

FIG. 7 is a perspective view of a plurality of the present invention. Shown is a perspective view of the present invention whereby a plurality of the support pipes 14 are screwed and stacked on top of one another via its threaded end and the aid of couplings 40 and shims 46 or collars 48 fastening into one another to form a continuous pipe column. Additionally shown is how the present invention is placed side by side in both the "x" and "z" directions of a 3d plane to present an extending planar surface for concrete form slabs 26.

Figure 8:
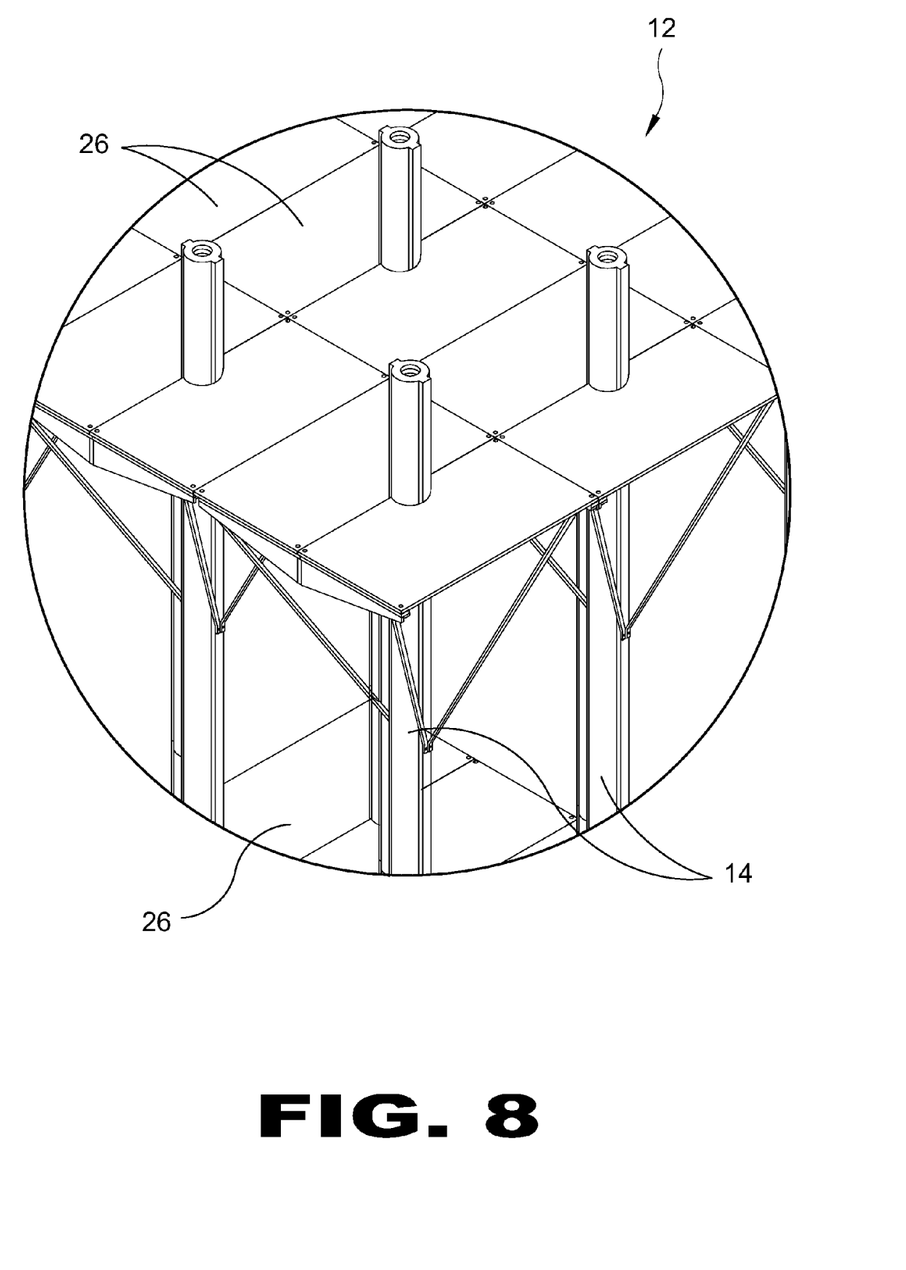
FIG. 8 is a detailed perspective view of the slab support column assemblies.

FIG. 8 is a detailed perspective view of the present invention demonstrating the relationship between the pipe columns 14 and form slabs 26.

Figure 9:
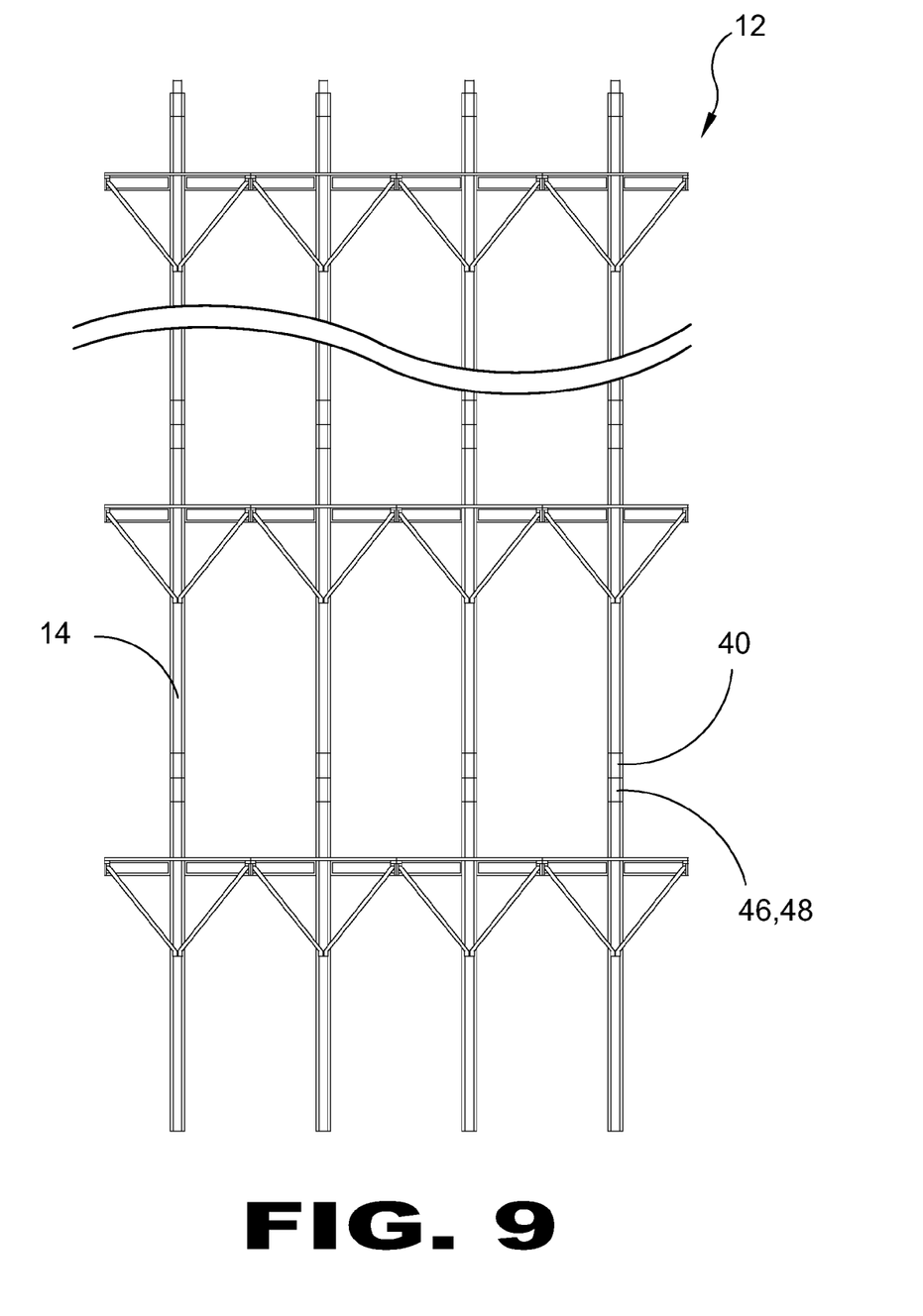
FIG. 9 is a side view of a three-tier arrangement of slab support column assemblies.

FIG. 9 is a side view of a plurality of the present invention. Shown is a side view of the pipe columns assemblies 12 stacked and secured to one another with couplings 40 and either collars 48 or shims 46 to a desired height in order to build a plurality of flat extending surfaces that may be utilized with the pouring and forming of concrete to make the floors of a multistory building.

Figure 10:
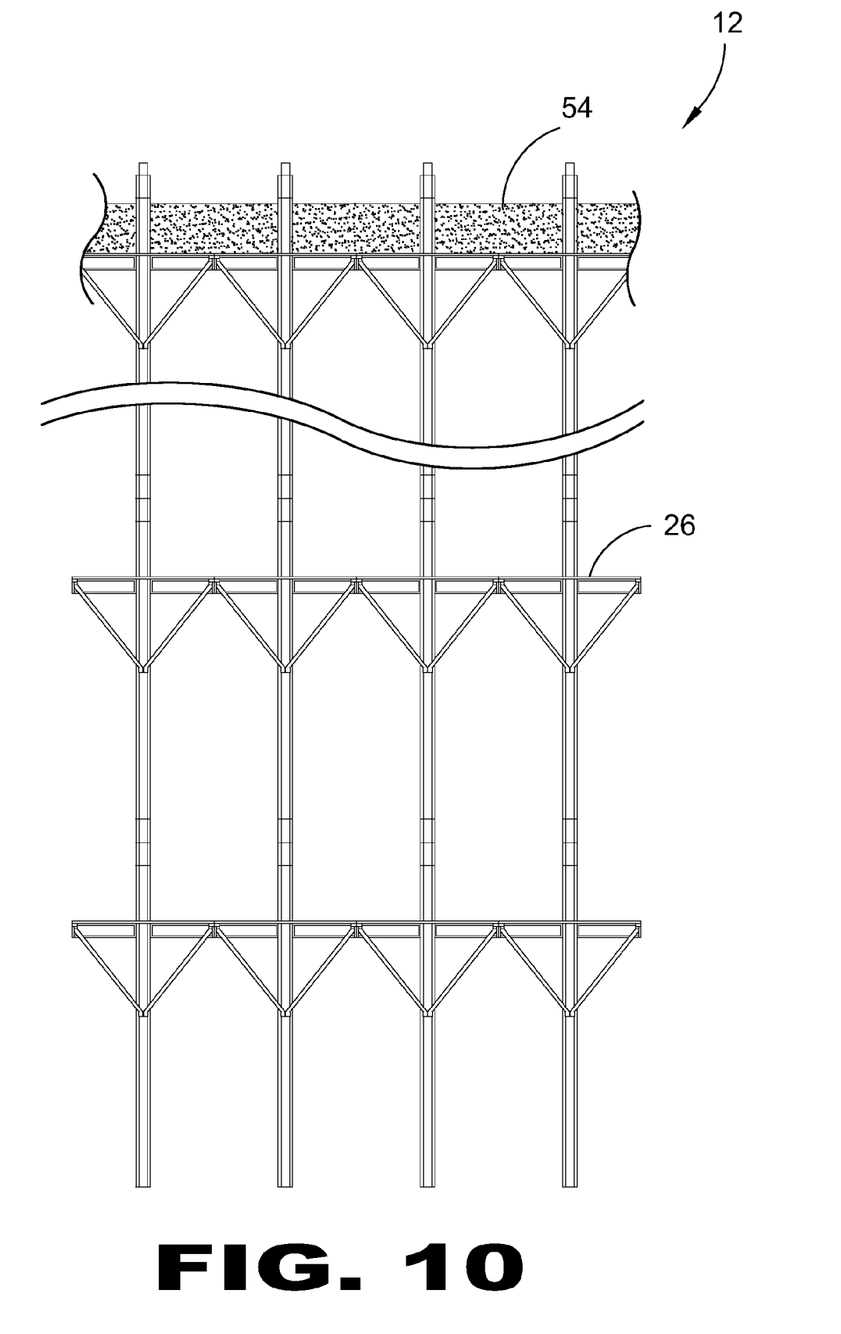
FIG. 10 is a side view of a three-tier arrangement of slab support column assemblies with a slab supported on the upper tier.

FIG. 10 is a side view of a plurality of the present invention. Shown is a side view of the present invention stacked and secured to one another to a desired height in order to build a plurality of flat extending surfaces. Additionally shown is the ability to pour concrete 54 onto forms 26 starting from the top floor, then progressively downward.

Figure 11:
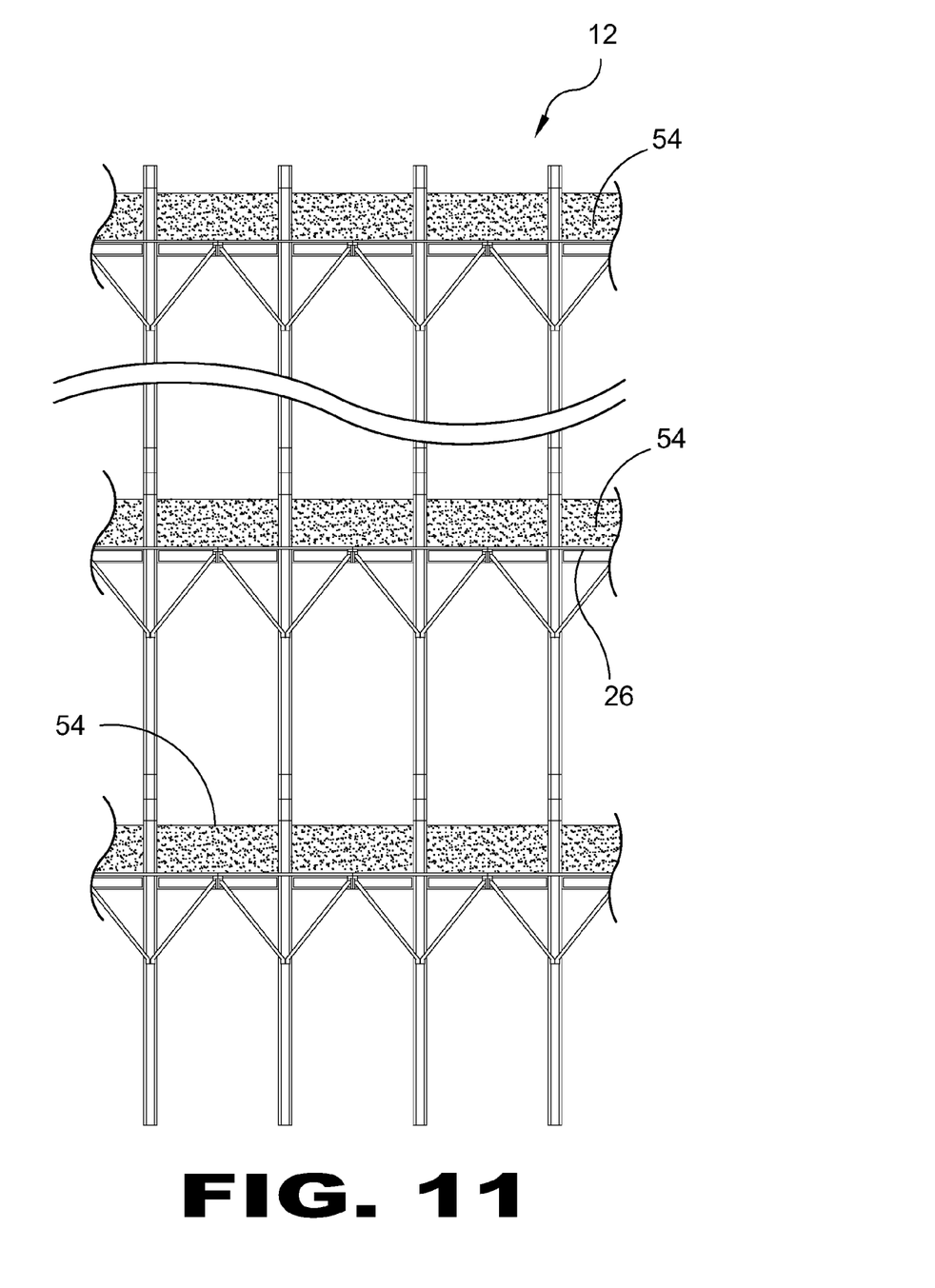
FIG. 11 is a side view of a three-tier arrangement of slab support column assemblies with a slab supported on each tier.

FIG. 11 is a side view of a plurality of the present invention. Shown is a side view of the present invention stacked and secured to one another to a desired height in order to build a plurality of flat extending surfaces. Additionally shown is the ability to pour concrete 54 onto forms 26 starting from the top floor, then progressively downward.

The invention claimed is:

1. A coupling system for vertically engaging support columns for concrete multi-floor construction, the system comprising:
  a) a plurality of slab support column assemblies;
  b) each slab support column assembly having a main support pipe, each main support pipe includes a threaded cavity at the top end thereof and a smooth recess at the bottom end thereof, each main support pipe having a skeletal framework disposed at a top portion thereof, each said skeletal frame work supporting a pair of form slabs;
  c) a coupling for connecting a subjacent main support pipe to a superadjacent main support pipe in a secure manner, said coupling comprises a threaded male projection at a bottom end and a smooth finish pin extending from a top end, said threaded male projection and said smooth finish pin are dimensioned to mate with said threaded cavity and said smooth recess respectively; and
  d) a spacer element positionable about the threaded male projection of the coupling for providing spacing between said subjacent main support pipe and the coupling, said spacer element is a pair of wedge shaped shims with each shim having a semi-circular cutout disposed on a narrow edge thereof dimensioned to encompass said threaded male projection.

2. The system of claim 1, wherein the threaded male projection of said coupling is partially screwed into the threaded cavity of the subjacent main support column and the spacer is placed about said threaded male projection.

3. The system of claim 1, wherein the characteristics of the said smooth finish pin within said smooth recess allows for the rotation of said superjacent main support pipe.

4. The system of claim 1, wherein said skeletal framework further including four braces extending divergently upward from said main support pipe supporting a pair of support brackets, a plurality of cross members extending from one said pair of support brackets.

5. The system of claim 4, wherein the support brackets of any one of said plurality of slab support column assemblies are capable of being secured to the support brackets of an adjacent slab support column.

6. The system of claim 4, wherein the form slabs each have a semicircular cut out on an edge thereof, said form slabs are dimensioned to sit on said cross members and attach to their respective support brackets.

7. The system of claim 1, further including a plurality of subjacent main support columns and a plurality of superadjacent main support columns, each subjacent support column being connected to a respective one of said plurality of superadjacent main support column for supporting a plurality of concrete floors.

8. The system of claim 7, wherein the system allows for the pouring of concrete from a top floor down to each subsequent floor in a single continuous pour.

9. A coupling system for vertically engaging support columns for concrete multi-floor construction, the system comprising:
  a) a plurality of slab support column assemblies;
  b) each slab support column assembly having a vertical main support pipe, each vertical main support pipe includes a threaded cavity at the top end thereof and a smooth recess at the bottom end thereof, each vertical main support pipe having a substantially horizontal skeletal framework disposed at a top portion thereof, said substantially horizontal skeletal frame work supporting a pair of form slabs;
  c) at least one coupling for connecting a subjacent vertical main support pipe to a superadjacent vertical main support pipe in a secure manner, each said at least one coupling comprises a threaded male projection at a bottom end and a smooth finish steel pin extending from a top end, said threaded male projection and said smooth finish steel pin are dimensioned to mate with said threaded cavity and said smooth recess respectively; and d) a spacer element positionable about the threaded male projection of the coupling for providing spacing between said subjacent vertical main support pipe and the coupling, spacer element is a pair of semi-cylindrical mating halves with edges thereof having L-shaped flanges that accept substantially U-shaped locking pins to form a cylindrical collar around said threaded male projection.

10. The system of claim 9, wherein the threaded male projection of said coupling is partially screwed into the threaded cavity of the subjacent main support column and the spacer is placed about said threaded male projection.

11. The system of claim 9, wherein the characteristics of the said smooth finish pin within said smooth recess allows for the rotation of said superjacent main support pipe.

12. The system of claim 9, wherein said skeletal framework further including four braces extending divergently upward from said main support pipe supporting a pair of support brackets, a plurality of cross members extending from one said pair of support brackets.

13. The system of claim 12, wherein the support brackets of any one of said plurality of slab support column assemblies are capable of being secured to the support brackets of an adjacent slab support column.

14. The system of claim 12, wherein the form slabs each have a semicircular cut out on an edge thereof, said form slabs are dimensioned to sit on said cross members and attach to their respective support brackets.

15. The system of claim 9, further including a plurality of subjacent main support columns and a plurality of superadjacent main support columns, each subjacent support column being connected to a respective one of said plurality of superadjacent main support column for supporting a plurality of concrete floors.

16. The system of claim 15, wherein the system allows for the pouring of concrete from a top floor down to each subsequent floor in a single continuous pour.

\* \* \* \* \*